(12) United States Patent
Bishop et al.

(10) Patent No.: US 11,169,000 B2
(45) Date of Patent: Nov. 9, 2021

(54) MULTI-TURN MEASUREMENT SYSTEM

(71) Applicants: Measurement Specialties, Inc., Hampton, VA (US); TE Connectivity Sensors Germany GmbH, Dortmund (DE)

(72) Inventors: James Bishop, Westlake Village, CA (US); Armin Meisenberg, Dortmund (DE); Scott Yankie, Simi Valley, CA (US)

(73) Assignees: MEASUREMENT SPECIALTIES, INC., Hampton, VA (US); TE CONNECTIVITY SENSORS GERMANY GMBH, Dortmund (DE)

( * ) Notice: Subject to any disclaimer, the term of this patent is extended or adjusted under 35 U.S.C. 154(b) by 116 days.

(21) Appl. No.: 16/562,522

(22) Filed: Sep. 6, 2019

(65) Prior Publication Data

US 2021/0072045 A1    Mar. 11, 2021

(51) Int. Cl.
*G01D 5/04* (2006.01)
*G01D 5/12* (2006.01)

(52) U.S. Cl.
CPC .............. *G01D 5/04* (2013.01); *G01D 5/12* (2013.01)

(58) Field of Classification Search
CPC .................................. G01D 5/04; G01D 5/12
See application file for complete search history.

(56) References Cited

U.S. PATENT DOCUMENTS

| | | | |
|---|---|---|---|
| 5,646,523 A | 7/1997 | Kaiser et al. | |
| 5,930,905 A | 8/1999 | Zabler et al. | |
| 6,507,188 B1 | 1/2003 | Dilger et al. | |
| 6,816,108 B2 | 11/2004 | Steinlechner et al. | |
| 7,579,829 B1 * | 8/2009 | Wong | G01D 5/04 324/207.15 |
| 8,847,584 B2 * | 9/2014 | Steinich | G01B 7/30 324/207.25 |
| 2003/0112157 A1 * | 6/2003 | Strasser | G01D 5/04 341/2 |
| 2003/0218458 A1 * | 11/2003 | Seger | G01D 5/142 324/303 |
| 2006/0208726 A1 * | 9/2006 | Mock | G01D 5/145 324/207.24 |
| 2015/0323349 A1 * | 11/2015 | Has | B62D 15/0215 324/207.15 |

FOREIGN PATENT DOCUMENTS

| | | |
|---|---|---|
| DE | 19625016 A1 | 1/1998 |
| DE | 19626654 C2 | 1/1998 |
| DE | 19732713 A1 | 2/1999 |
| DE | 19855960 A1 | 6/2000 |
| DE | 19849108 C2 | 12/2001 |
| EP | 0699151 B1 | 3/2001 |
| EP | 0877916 B1 | 4/2003 |
| EP | 1315979 B1 | 4/2007 |

\* cited by examiner

*Primary Examiner* — Akm Zakaria

(57) ABSTRACT

A multi-turn measurement system includes a plurality of gears, a plurality of pinions engaging the plurality of gears, a plurality of magnets each disposed on one of the plurality of gears, and a plurality of magnetic field sensors. Rotation of the pinions about a center axis drives rotation of the plurality of gears. The magnets each have a magnetic field that changes based on an angular position of the one of the plurality of gears. The magnetic field sensors are each positioned to sense the magnetic field of one of the plurality of magnets.

20 Claims, 5 Drawing Sheets

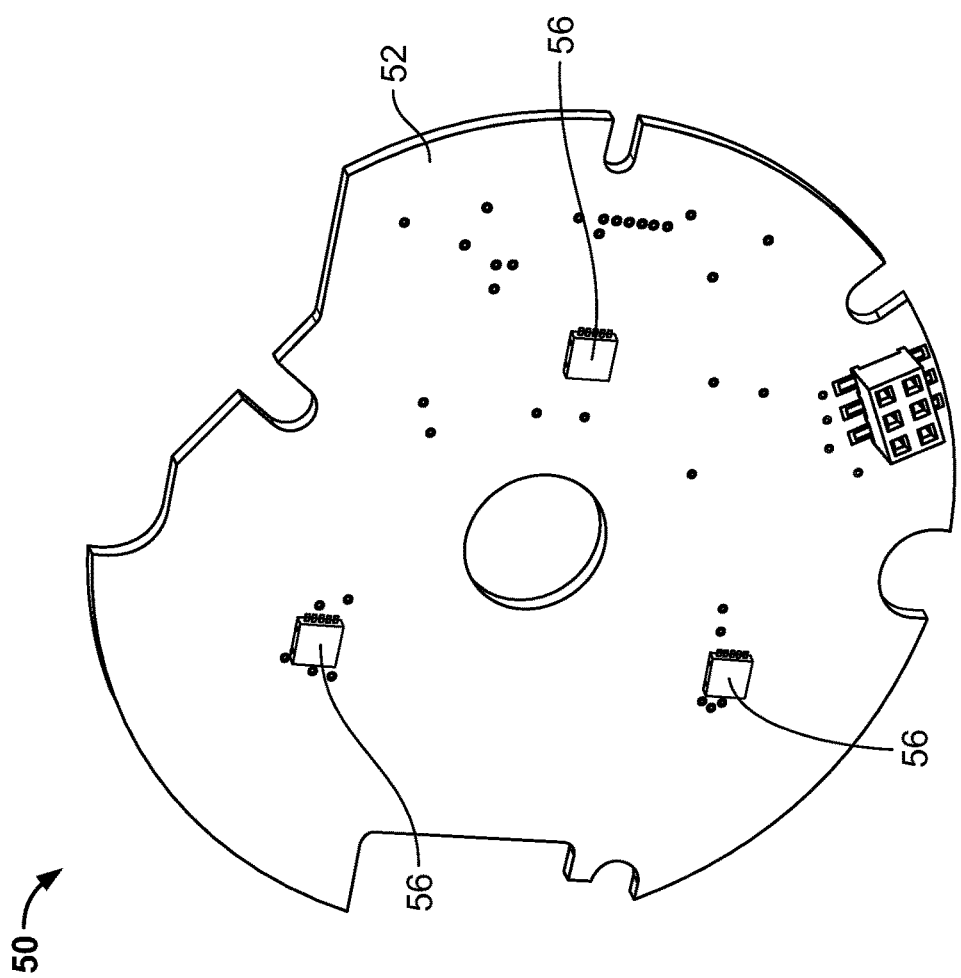

MULTI-TURN MEASUREMENT SYSTEM

FIELD OF THE INVENTION

The present invention relates to a measurement system and, more particularly, to a measurement system capable of measuring rotation over multiple turns.

BACKGROUND

Existing measurement systems are used to measure rotation of a shaft over multiple turns, indicating both an angular position of the shaft and a number of rotations undergone by the shaft at a given point in time. Such a measurement system is used, for example, in a cable actuated position sensor, in which a cable is wound around the shaft and the shaft rotates as the cable is pulled and unwound from the shaft. The angular position of the shaft and the number of rotations of the shaft indicate a length of the cable that has been unwound for measurement of linear position in various applications.

The angular position of the shaft and the number of rotations of the shaft in such measurement systems are commonly measured by a potentiometer; rotation of the shaft linearly changes an output voltage of the potentiometer. Potentiometers, however, are very expensive at high levels of accuracy. Furthermore, potentiometers are highly prone to mechanical failure due to unreliable manufacturing, which leads to electrical problems and correspondingly inaccurate measurements.

SUMMARY

A multi-turn measurement system includes a plurality of gears, a plurality of pinions engaging the plurality of gears, a plurality of magnets each disposed on one of the plurality of gears, and a plurality of magnetic field sensors. Rotation of the pinions about a center axis drives rotation of the plurality of gears. The magnets each have a magnetic field that changes based on an angular position of the one of the plurality of gears. The magnetic field sensors are each positioned to sense the magnetic field of one of the plurality of magnets.

BRIEF DESCRIPTION OF THE DRAWINGS

The invention will now be described by way of example with reference to the accompanying Figures, of which:

FIG. 5 is a perspective view of the sensor board.

DETAILED DESCRIPTION OF THE EMBODIMENT(S)

Figure 1:
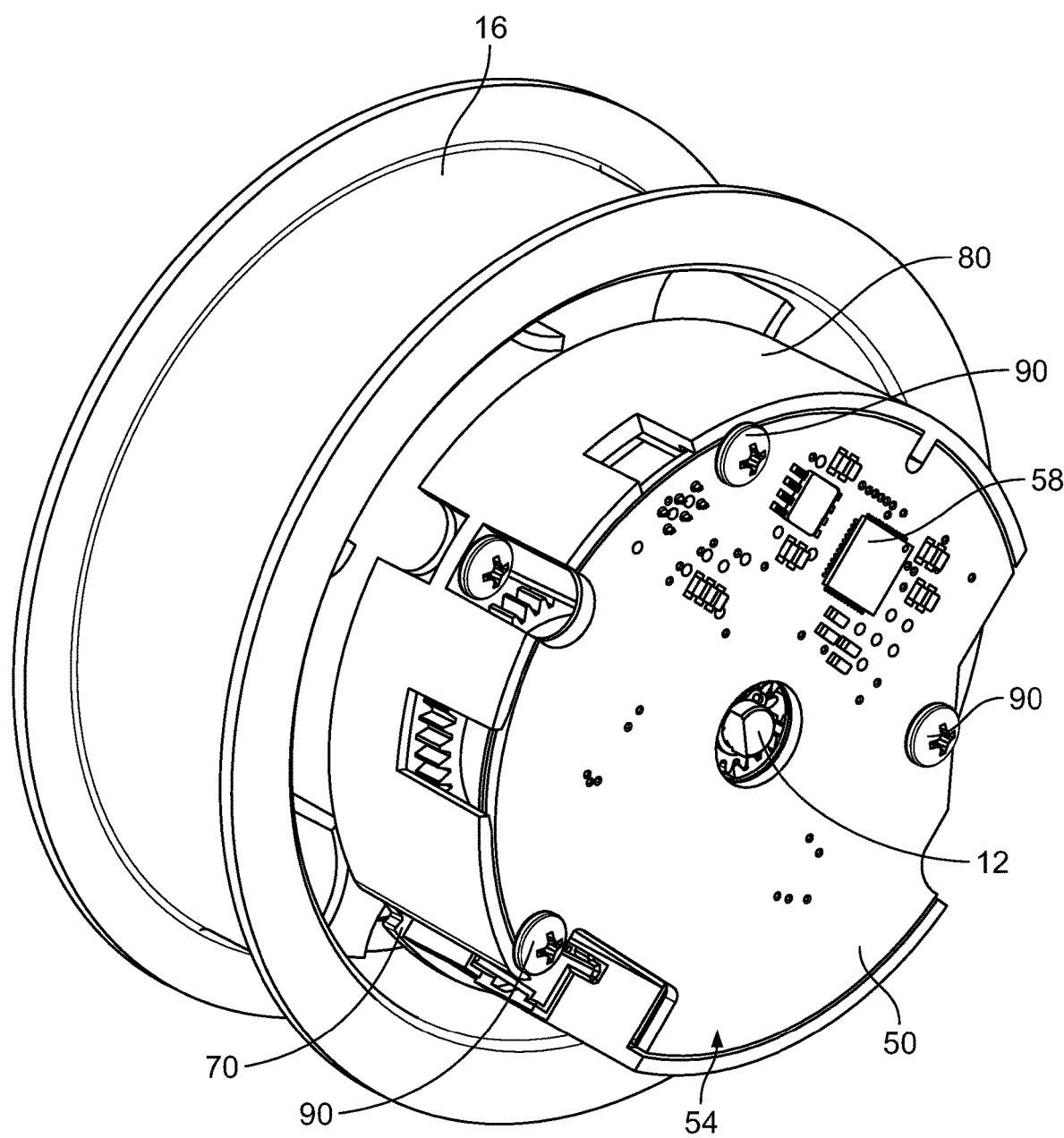
FIG. 1 is a perspective view of a multi-turn measurement system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 2:
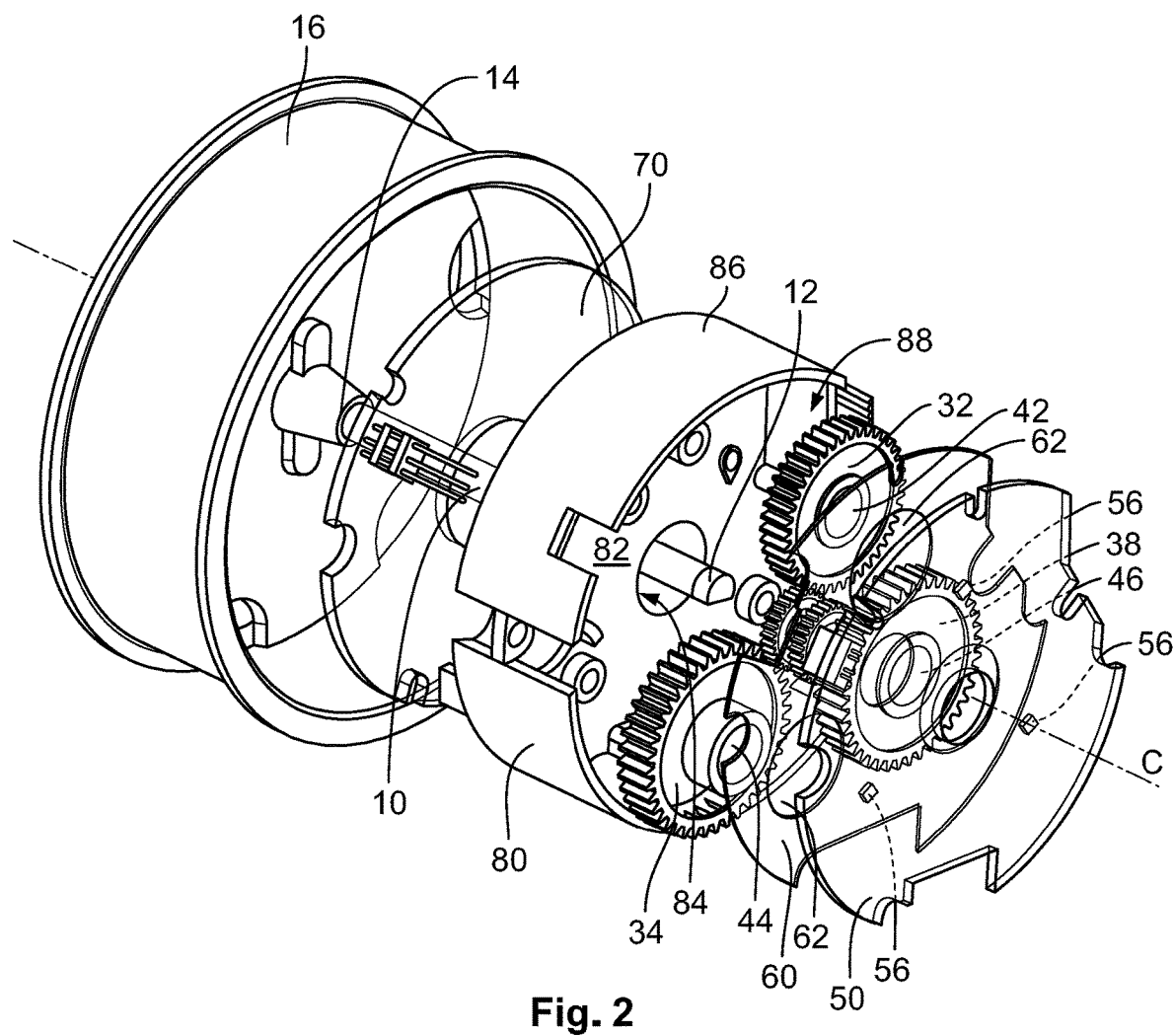
FIG. 2 is an exploded perspective view of the multi-turn measurement system with a sensor board and an electromagnetic shield of the multi-turn measurement system shown as transparent.

A multi-turn measurement system according to an embodiment is shown in FIGS. 1 and 2. The measurement system, as shown in FIGS. 1 and 2, comprises a shaft 10, a plurality of pinions 20 disposed on and rotatable with the shaft 10, a plurality of gears 30 engaging the plurality of pinions 20 and driven by rotation of the pinions 20, a plurality of magnets 40 disposed on the gears 30, and a sensor board 50 disposed adjacent the gears 30 and the magnets 40.

Figure 3:
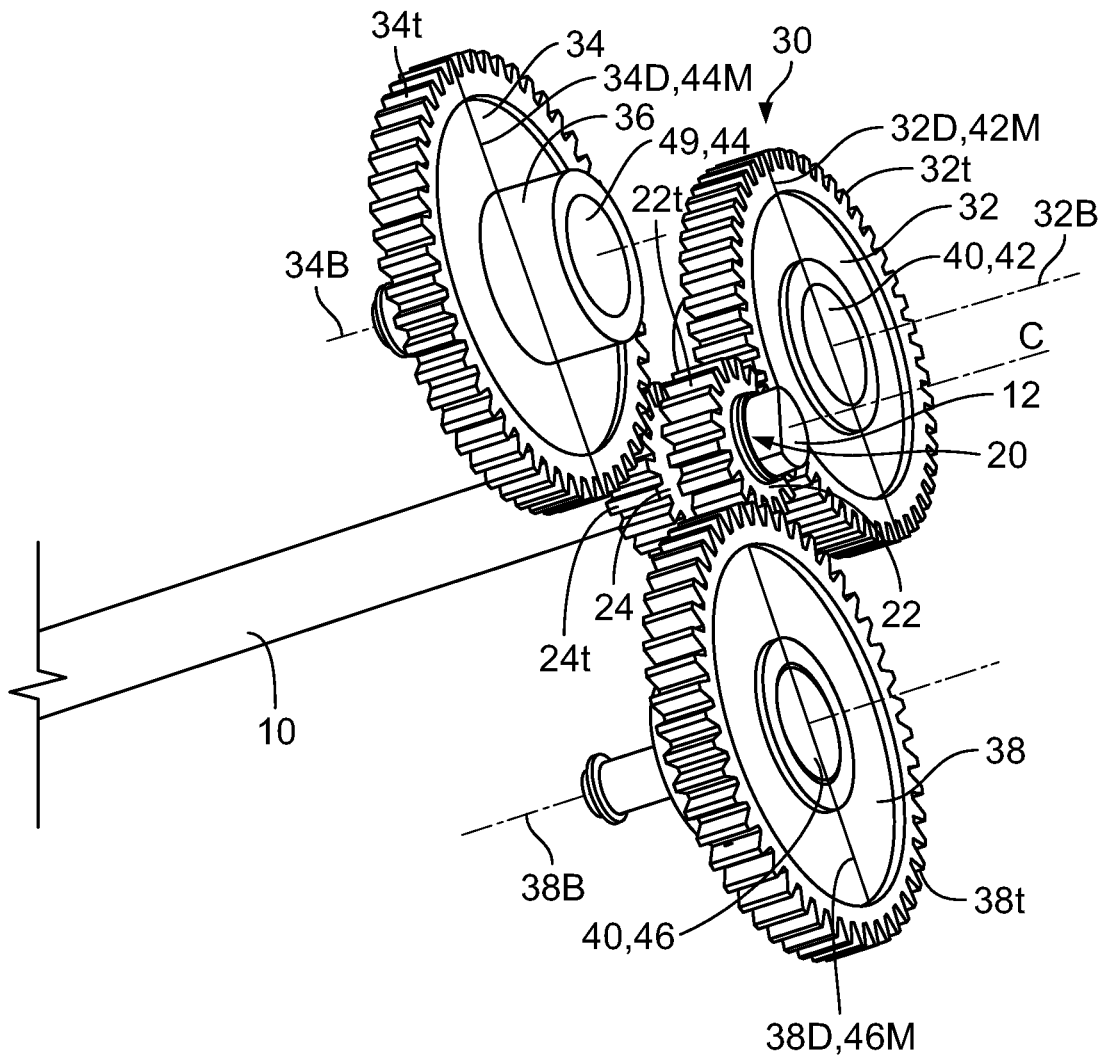
FIG. 3 is a perspective view of a shaft, a plurality of pinions, a plurality of gears, and a plurality of magnets of the multi-turn measurement system.

The shaft 10, as shown in FIGS. 2 and 3, extends along a center axis C between a first end 12 and a second end 14. In the embodiment shown in FIGS. 1 and 2, the first end 12 is a free end and the second end 14 is rotationally fixed to a spool 16 that extends around a portion of the shaft 10. In this embodiment, a cable, a string, or any other length of material known to those with ordinary skill in the art can be wound around the spool 16, with an unwinding of the length of material imparting rotation to the spool 16 and a corresponding rotation to the shaft 10. In another embodiment, the shaft 10 is not secured to the spool 16; in this embodiment, various other elements known to those with ordinary skill in the art can impart rotation to the shaft 10.

Figure 4:
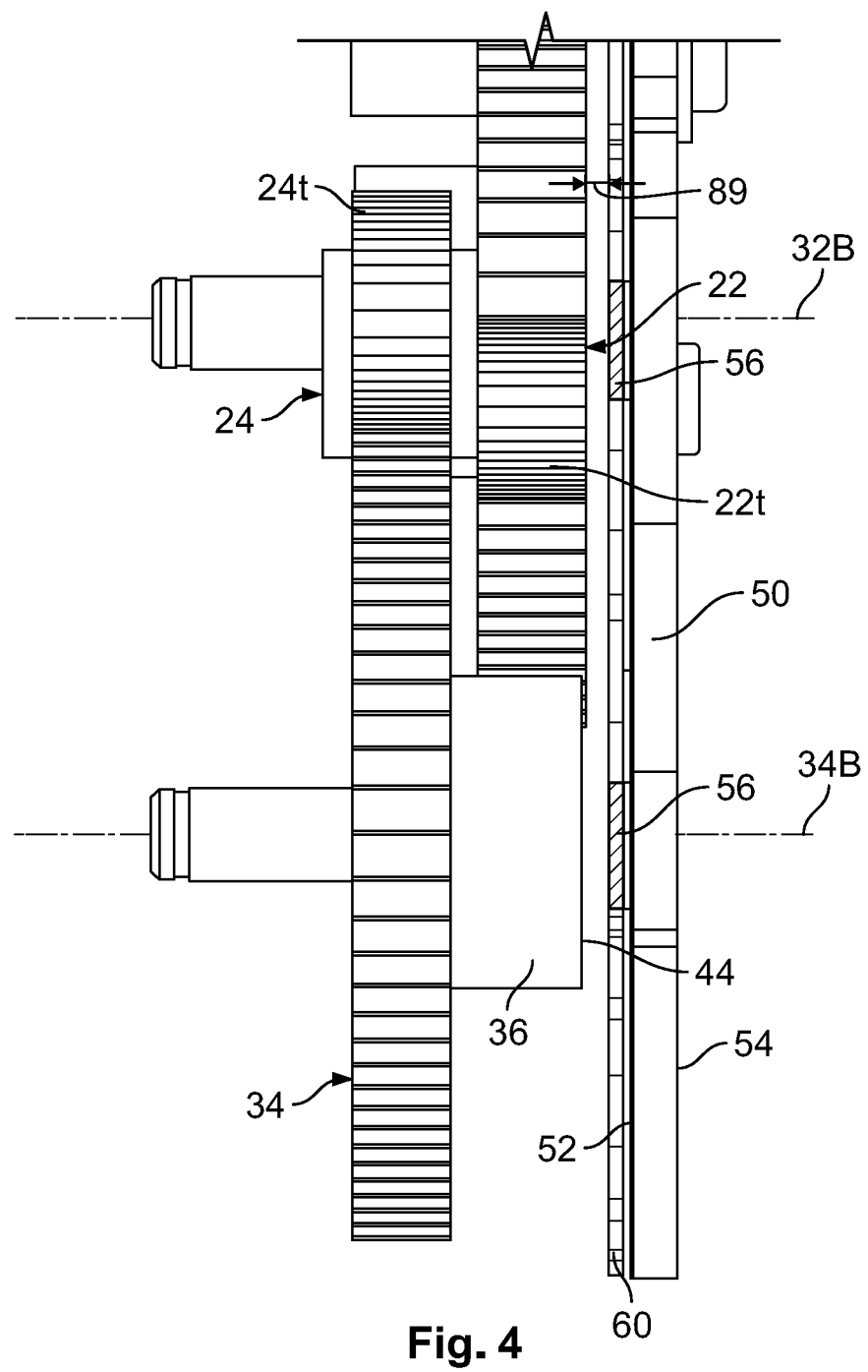
FIG. 4 is a detailed side view of a portion of the pinions, the gears, the magnets, the sensor board, and the electromagnetic shield of the multi-turn measurement system.

The plurality of pinions 20, as shown in FIGS. 2-4, include a first pinion 22 and a second pinion 24. The first pinion 22 is a circular member having a plurality of first pinion teeth 22t disposed evenly around an outer circumference of the first pinion 22. The second pinion 24 is a circular member having a plurality of second pinion teeth 24t disposed evenly around an outer circumference of the second pinion 24. The number of first pinion teeth 22t differs from the number of second pinion teeth 24t and a diameter of the first pinion 22 differs from a diameter of the second pinion 24. In the shown embodiment, the number of first pinion teeth 22t is less than the number of second pinion teeth 24t and the diameter of the first pinion 22 is less than the diameter of the second pinion 24. In the shown embodiment, the number of first pinion teeth 22t is sixteen and the number of second pinion teeth 24t is eighteen. The particular and relative number of teeth and diameters of the first pinion 22 and the second pinion 24 may be different in other embodiments.

The pinions 20, as shown in FIG. 3, are disposed on the first end 12 of the shaft 10. The first pinion 22 and the second pinion 24 are disposed at different positions along the center axis C. In the shown embodiment, the second pinion 24 is disposed closer to the second end 14 of the shaft 10 than the first pinion 22. The pinions 20 are rotationally fixed to the shaft 10 and rotate simultaneously about the center axis C in correspondence with rotation of the shaft 10.

The plurality of gears 30, as shown in FIGS. 2 and 3, include a first gear 32, a second gear 34, and a third gear 38. The first gear 32, as shown in FIG. 3, is a circular member having a first gear diametric direction 32D and a plurality of first gear teeth 32t disposed evenly around an outer circumference of the first gear 32. The first gear 32 rotates about a first axis of rotation 32B. The second gear 34 is a circular member having a second gear diametric direction 34D and a plurality of second gear teeth 34t disposed evenly around an outer circumference of the second gear 34. The second gear 34 rotates about a second axis of rotation 34B. The second gear 34, as shown in FIG. 3, has an extension 36 positioned in center of the second gear 34 and protruding from the second gear 34 along the second axis of rotation 34B. The third gear 38 is a circular member having a third gear diametric direction 38D and a plurality of third gear teeth 38t disposed evenly around an outer circumference of the third gear 38. The third gear 38 rotates about a third axis of rotation 38B. The first axis of rotation 32B, the second axis of rotation 34B, and the third axis of rotation 38B are all parallel to each other and parallel to the center axis C.

The number of first gear teeth 32t differs from the number of second gear teeth 34t and a diameter of the first gear 32 differs from a diameter of the second gear 34. The number of second gear teeth 34t is equal to the number of third gear teeth 38t and the diameter of the second gear 34 is equal to the diameter of the third gear 38. In the shown embodiment, the number of first gear teeth 32t is less than the number of second gear teeth 34t and third gear teeth 38t, and the diameter of the first gear 32 is less than the diameters of the second gear 34 and the third gear 38. In the shown embodiment, the number of first gear teeth 32t is forty-two and the number of second gear teeth 32t and third gear teeth 38t is forty-eight. In other embodiments, the particular and relative number of teeth and diameters of the first gear 32, second gear 34, and third gear 38 may be different.

As shown in FIG. 3, the first gear 32 and the third gear 38 are disposed at a different position along the center axis C than the second gear 34; the first gear 32 and the third gear 38 are positioned to engage the first pinion 22 and the second gear 34 is positioned to engage the second pinion 24. The first gear 32 and the third gear 38 are aligned at a same position along the center axis C. Rotation of the first pinion 22 drives rotation of the first gear 32 about the first axis of rotation 32B and the third gear 38 about the third axis of rotation 38B, and rotation of the second pinion 24 drives rotation of the second gear 34 about the second axis of rotation 34B.

The plurality of magnets 40, as shown in FIGS. 2 and 3, include a first magnet 42 disposed on the first gear 32, a second magnet 44 disposed on the second gear 34, and a third magnet 46 disposed on the third gear 38. The second magnet 44, as shown in FIG. 3, is positioned on the extension 36 of the second gear 34 such that it is coplanar with the first magnet 42 and the third magnet 46. Each of the magnets 40 is positioned centrally on the axis of rotation 32B, 34B, 38B of the respective gear 30. A magnetization direction 42M, 44M, 46M of each of the magnets 40, that is, a direction extending between the north and south poles of the magnets 40, extends in the diametric direction 32D, 34D, 38D of the respective gear 30. The magnets 40 each rotate with the respective gear 30.

The sensor board 50, shown in FIGS. 1, 2, 4, and 5, is a printed circuit board having a first side 52 and an opposite second side 54. A plurality of magnetic field sensors 56 are disposed on the first side 52 of the sensor board 50. The number of magnetic field sensors 56 corresponds to the number of magnets 40 disposed on the gears 30; in the shown embodiment, there are three magnetic field sensors 56. In an embodiment, each of the magnetic field sensors 56 is an anisotropic magneto-resistive (AMR) sensor.

As shown in FIG. 1, an integrated circuit 58 is disposed on the second side 54 of the sensor board 50. The integrated circuit 58 is electrically connected to each of the magnetic field sensors 56 through the wiring of the sensor board 50 and is capable of receiving an electrical signal from each of the magnetic field sensors 56. The integrated circuit 58 includes a processor and a memory connected to the processor. The memory is a non-transitory computer readable medium and stores an algorithm thereon that is executable by the processor to, as described in greater detail below, generate an output signal based on the input signals from the magnetic field sensors 56. In the shown embodiment, the integrated circuit 58 is a commercially available application specific integrated circuit ("ASIC") known as an iC-MNF manufactured by iC Haus.

As shown in FIGS. 1, 2, and 4, the sensor board 50 is positioned adjacent to the gears 30 with the first side 52 of the sensor board 50 facing the gears 30 and magnets 40. Each of the magnetic field sensors 56 is positioned centrally in alignment with one of the magnets 40 along the axis of rotation 32B, 34B, 38B of the respective magnet 40.

In the embodiment shown in FIGS. 2 and 4, the multi-turn measurement system comprises an electromagnetic shield 60. The electromagnetic shield 60, as shown in FIG. 2, is formed from a sheet of material and includes a plurality of sensor passageways 62 extending through the electromagnetic shield 60. In an embodiment, the sensor passageways 62 are punched into the sheet of material. In the shown embodiment, the electromagnetic shield 60 is formed of a steel material. In other embodiments, the electromagnetic shield 60 may be formed of an iron material or any other material capable of performing electromagnetic shielding as known to those with ordinary skill in the art.

As shown in FIGS. 2 and 4, the electromagnetic shield 60 is positioned on the first side 52 of the sensor board 50 and is disposed between the gears 30 and the sensor board 50. Each of the magnetic field sensors 56 is disposed in one of the sensor passageways 62 of the electromagnetic shield 60 and is surrounded by the electromagnetic shield 60. As shown in FIG. 4, each of the magnetic field sensors 56 protrudes from the first side 52 of the sensor board 50 by approximately a same amount as a thickness of the electromagnetic shield 60.

In the embodiment shown in FIGS. 1 and 2, the multi-turn measurement system comprises a communication board 70. The communication board 70 is a printed circuit board electrically connected to the sensor board 50 and adapted to receive the output signal from the integrated circuit 58. The communication board 70 has one of a plurality of different types of electrical connection ports and/or one of a plurality of different types of signal formats embodied in a plurality of electrical components known to those with ordinary skill in the art that are installed on the communication board 70.

The multi-turn measurement system, in the embodiment shown in FIGS. 1 and 2, comprises a housing 80 in which the shaft 10, the pinions 20, the gears 30, the magnets 40, the sensor board 50, the electromagnetic shield 60, and the communication board 70 are assembled. The housing 80, as shown in FIG. 2, has a base 82, a shaft passageway 84 extending centrally through the base 82, and a side wall 86 extending from the base 82 around the center axis C. The base 82 and the side wall 86 define a component receiving space 88.

As shown in FIGS. 1 and 2, the shaft 10 extends through the shaft passageway 84 and the pinions 20, the gears 30, the magnets 40, the sensor board 50, and the electromagnetic shield 60 are positioned within the component receiving space 88. The gears 30 are secured to the base 82 and are rotatable about their respective axes of rotation 32B, 34B, 38B with respect to the housing 80. The sensor board 50, with the electromagnetic shield 60 disposed on the first side 52 of the sensor board 50, is positioned to enclose a majority of the component receiving space 88. In the assembled state, as shown in FIG. 4, the magnetic field sensors 56 and the electromagnetic shield 60 are positioned with a spacing 89 in a direction parallel to the center axis C from the magnets 40 on the gears 30. The communication board 70 is positioned within the housing 80 on a side of the base 82 opposite the component receiving space 88. As shown in the embodiment of FIG. 1, a plurality of fasteners 90 may be used to secure the multi-turn measurement system in the assembled state.

The multi-turn measurement system measures a number of rotations of the shaft 10 about the center axis C and an angular position of the shaft 10 about the center axis C, as will now be described in greater detail.

Rotation of the shaft 10 about the center axis C may be driven by rotation of the spool 16 or may be driven directly by an external element. As the shaft 10 rotates about the center axis C, the pinions 20 simultaneously rotate about the center axis C and drive the gears 30 to rotate about their respective axes of rotation 32B, 34B, 38B, shown in FIG. 3. Because the pinions 20 have different numbers of teeth 22t, 24t, and some of the gears 30 have different numbers of teeth 32t, 34t, 38t and engage different pinions 20, the gears 30 each have a different gear ratio and each have a different angular position about their axes of rotation 32B, 34B, 38B. The arrangement of relative teeth 22t, 24t of the pinions 20 and teeth 32t, 34t, 38t of the gears 30, and engagement of the different gears 30 with the different pinions 20, requires a large number of rotations of the shaft 10 to reach a position in which each of the gears 30 have returned to a same starting angular position.

Each of the magnets 40 has a magnetic field that, due to the rotation of the respective gear 30, changes based on the angular position of the respective gear 30. The magnetic field sensors 56 that are aligned with the magnets 40, as shown in FIGS. 2 and 4, each sense the magnetic field of one of the plurality of magnets 40. The magnetic field sensors 56 each output a sensor signal to the integrated circuit 58 that is indicative of the magnetic field of the magnet 40 with which the magnetic field sensor 56 is aligned; the sensor signals output by the magnetic field sensors 56 change as the magnetic field of each of the magnets 40 rotates due to rotation of the respective gear 30. The positioning of the magnetic field sensors 56 within the sensor passageways 62 of the electromagnetic shield 60 improves the quality of the sensor signals output by the magnetic field sensors 56, limiting an influence of external electrical fields and stray magnetic fields from other the magnets 40 with which the magnetic field sensor 56 is not aligned on the detection of the magnetic field of the aligned magnet 40.

The integrated circuit 58 receives the sensor signals from each of the magnetic field sensors 56. In the shown embodiment, the integrated circuit 58 receives three sensor signals; a first sensor signal representing the magnetic field of the first magnet 42 about the first axis of rotation 32B, a second sensor signal representing the magnetic field of the second magnet 44 about the second axis of rotation 34B, and a third sensor signal representing the magnetic field of the third magnet 46 about the third axis of rotation 38B.

Because the magnetic field of each of the magnets 40 varies due to the rotation of the respective gear 30, the sensor signals received at the integrated circuit 58 are representative of an angular position of each of the gears 30 at a given point in time. The algorithm stored on the integrated circuit 58 processes the received sensor signals based in part on the Vernier principle. The integrated circuit 58 stores possible combinations of three sensor signals from the magnetic field sensors 56 each in association with a unique rotational position of the shaft 10 including both the number of rotations of the shaft 10 and the angular position of the shaft 10 within the current rotation. That is, because the gears 30 each have a different gear ratio and each have a different angular position about their axes of rotation 32B, 34B, 38B through a large number of rotations of the shaft 10, each set of three sensor signals representing the magnetic fields of the magnets 40 on the gears 30 is distinguishable and can individually be associated with a particular rotational position of the shaft around the center axis C. In an embodiment of the integrated circuit 58, each combination of sensor signals representing the magnetic fields of the magnets 40 during rotation of the gears 30 can be associated with a unique rotational position of the shaft 10 up to eighty-four rotations of the shaft 10 about center axis C in each of a clockwise and a counterclockwise rotational direction.

The integrated circuit 58 determines the unique rotational position of the shaft 10 at a given time based on execution of the algorithm to ascertain the unique rotational position associated with the sensor signals received at the given time. The integrated circuit 58 is capable of determining the unique rotational position of the shaft 10 at any given time during operation of the multi-turn measurement system, including immediately after turning on the multi-turn measurement system. In an embodiment, the integrated circuit 58 determines the unique rotational position of the shaft 10 based only on the sensor signals received from the magnetic field sensors 56.

The integrated circuit 58 embodied as the iC-MNF manufactured by iC Haus is adapted to perform the described calculations for a particular relationship of angular velocity and angular position between the gears 30. The plurality of pinions 20 allow the sensor signals from the magnetic field sensors 56 to be processed by the integrated circuit 58 with the gears 30 having a smaller number of teeth 32t, 34t, 38t, decreasing an overall size of the multi-turn measurement system.

The integrated circuit 58 sends the unique rotational position of the shaft 10 as the output signal to the communication board 70 in a format readable by the communication board 70. In an embodiment, the integrated circuit 58 outputs the output signal as a serial peripheral interface (SPI) signal. The communication board 70, shown in FIGS. 1 and 2, transmits the output signal from the integrated circuit 58 to a device external from the multi-turn measurement system. The communication boards 70 are interchangeable and the particular communication board 70 used with the multi-turn measurement system is chosen based on the desired connection arrangement and signal format of the output signal.

What is claimed is:
1. A multi-turn measurement system, comprising:
a plurality of gears;
a plurality of pinions engaging the plurality of gears, rotation of the pinions about a center axis drives rotation of the plurality of gears;
a plurality of magnets each disposed on one of the plurality of gears and having a magnetic field that changes based on an angular position of the one of the plurality of gears;
a plurality of magnetic field sensors each positioned to sense the magnetic field of one of the plurality of magnets; and a shaft, the pinions are each disposed on the same shaft and rotate with the shaft about the center axis.

2. The multi-turn measurement system of claim 1, wherein each of the pinions has a different number of teeth.

3. The multi-turn measurement system of claim 2, wherein the pinions rotate simultaneously about the center axis.

4. The multi-turn measurement system of claim 3, wherein the plurality of pinions include a first pinion and a second pinion disposed at different positions along the center axis.

5. The multi-turn measurement system of claim 1, wherein the plurality of gears include a first gear and a second gear having a different number of teeth.

6. The multi-turn measurement system of claim 4, wherein the first gear and the second gear are disposed at different positions along the center axis, the first gear engaging the first pinion and the second gear engaging the second pinion.

7. The multi-turn measurement system of claim 6, wherein the plurality of gears include a third gear aligned with the first gear along the center axis and engaging the first pinion.

8. The multi-turn measurement system of claim 1, wherein each of the magnets is positioned centrally on an axis of rotation of one of the gears.

9. The multi-turn measurement system of claim 8, wherein a magnetization direction of each of the magnets extends in a diametric direction of the one of the gears.

10. The multi-turn measurement system of claim 1, wherein the magnetic field sensors are disposed on a side of a sensor board facing the magnets, each of the magnetic field sensors is aligned with one of the magnets in a direction parallel to the center axis.

11. The multi-turn measurement system of claim 10, further comprising an electromagnetic shield disposed between the sensor board and the gears.

12. The multi-turn measurement system of claim 11, wherein each of the magnetic field sensors is disposed in one of a plurality of passageways extending through the electromagnetic shield.

13. The multi-turn measurement system of claim 1, further comprising an integrated circuit connected to the magnetic field sensors and receiving a plurality of signals representing the magnetic field of each of the magnets.

14. The multi-turn measurement system of claim 13, wherein the integrated circuit determines a number of rotations of the shaft about the center axis based on the signals.

15. The multi-turn measurement system of claim 14, wherein the integrated circuit determines an angular position of the shaft about the center axis based on the signals.

16. The multi-turn measurement system of claim 15, wherein the integrated circuit associates a unique rotational position of the shaft including both the number of rotations of the shaft and the angular position of the shaft with each of a plurality of combinations of the signals.

17. The multi-turn measurement system of claim 16, wherein the integrated circuit is capable of determining the unique rotational position at any given time during operation of the multi-turn measurement system.

18. The multi-turn measurement system of claim 16, wherein the integrated circuit determines the unique rotational position based only on the signals.

19. The multi-turn measurement system of claim 16, further comprising a communication board receiving an output signal representative of the unique rotational position from the integrated circuit, the communication board transmitting the output signal externally of the multi-turn measurement system.

20. A multi-turn measurement system, comprising:
a plurality of gears;
a plurality of pinions engaging the plurality of gears, rotation of the pinions about a center axis drives rotation of the plurality of gears, each of the pinions has a different number of teeth;
a plurality of magnets each disposed on one of the plurality of gears and having a magnetic field that changes based on an angular position of the one of the plurality of gears; and
a plurality of magnetic field sensors each positioned to sense the magnetic field of one of the plurality of magnets.

* * * * *